July 17, 1951 M. DEN HERTOG 2,561,051

GROUP SELECTION CONTROL CIRCUIT

Filed June 12, 1950 2 Sheets-Sheet 1

Inventor
MARTINUS DEN HERTOG

By Robert Harding Jr.
Attorney

July 17, 1951 M. DEN HERTOG 2,561,051

GROUP SELECTION CONTROL CIRCUIT

Filed June 12, 1950 2 Sheets-Sheet 2

Inventor
MARTINUS DEN HERTOG

By Robert Harding Jr.
Attorney

Patented July 17, 1951 2,561,051

UNITED STATES PATENT OFFICE 2,561,051

GROUP SELECTION CONTROL CIRCUIT

Martinus den Hertog, Antwerp, Belgium, assignor to International Standard Electric Corporation, New York, N. Y., a corporation of Delaware Application June 12, 1950, Serial No. 167,672
In France June 2, 1949

8 Claims. (Cl. 177—353)

The present invention relates to a scanning system which in particular makes it possible to select a circuit from one or more groups of circuits, the scanning operation being effected by simple means and in an extremely short time.

One of the features of the invention is the employment of static electrical means in order automatically to test the electrical condition of a plurality of circuits to which said static means have access and to effect a selection of one circuit in a particular group of said circuits.

Another characteristic of the invention is the testing in a predetermined order by static electrical means of a certain number of circuits divided up into several groups, arrangements being provided for controlling the order of scanning of the circuits, for proceeding successively with the identity testing of each of the circuits in terms of the grouping of said circuits, and for testing the electrical condition of the circuits.

Another characteristic of the invention consists in a system for scanning one or more groups of circuits and selecting one circuit in a particular group, and for recording the identity of the selected circuit, and for effecting, under the control of the registering device, the operations of connection of the selected circuit.

Another feature of the invention consists of a selection system for selecting one circuit in one or more groups of circuits, in which several stages of time positioned control impulses are employed to control the scanning.

Another characteristic of the invention consists of a device for selecting one circuit in a set of groups of circuits and comprising a group of electrical switches, the number of said electrical switches being equal to the maximum number of circuits in a group and their arrangement being provided on the one hand in order to control the selection of the group of circuits and on the other hand in order to control the selection of one circuit in the selected group.

Another characteristic of the invention consists of a device for selecting one circuit in a set of groups of circuits and comprising a group of thermionic or gas discharge devices, each device comprising several electrodes, the number of devices in each group being equal to the maximum number of circuits in one group, and their arrangement being provided in order on the one hand to control the selection of the group of circuits and on the other hand to control the selection of one circuit in the selected group.

The essence of the invention and various other characteristics will appear from the following description given as a non-limitative example with reference to the attached drawings, in which.

Figure 1:
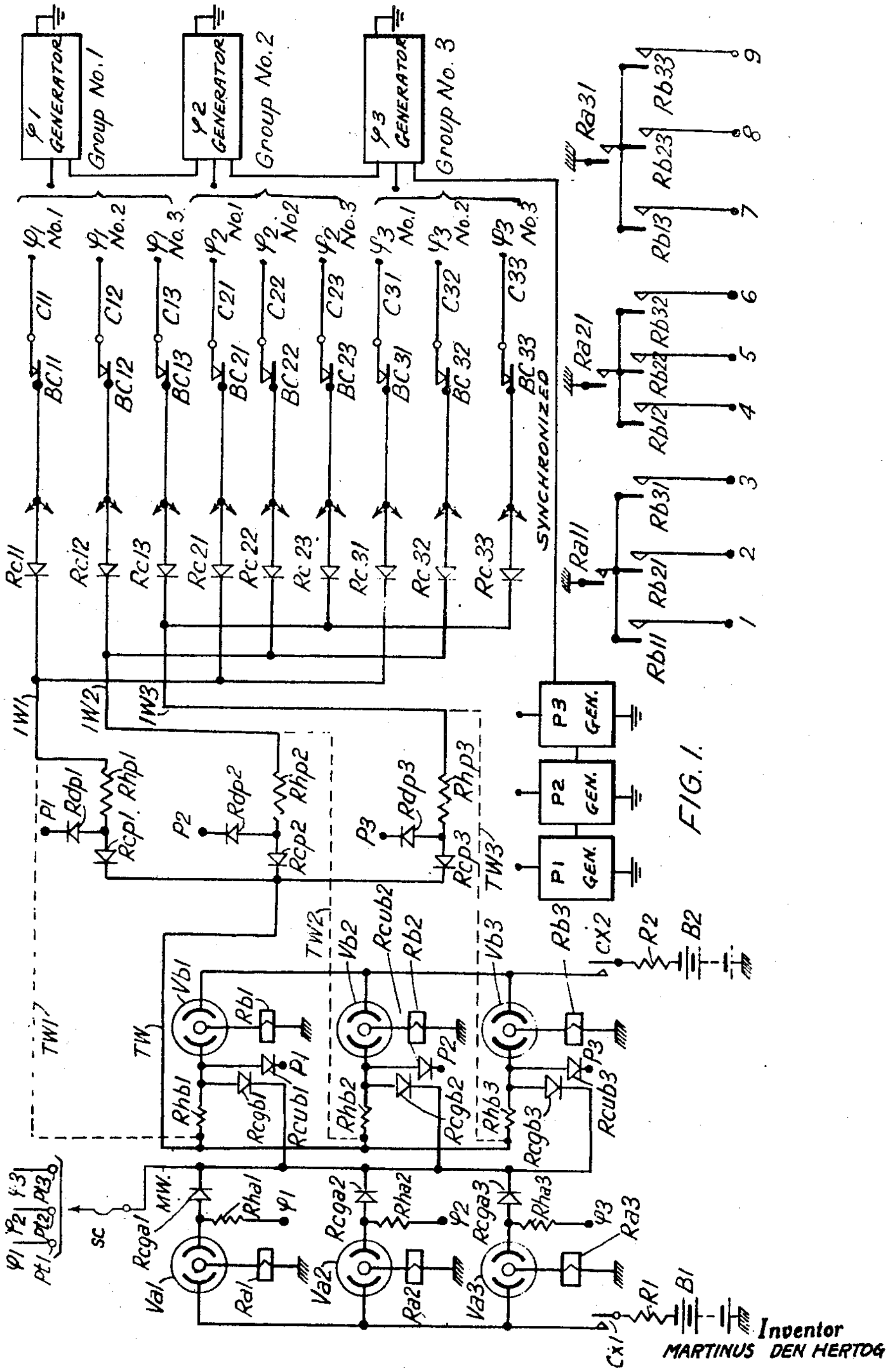
Fig. 1 shows a selection control circuit comprising a group of cold cathode tubes for the purpose of selecting a free circuit in a certain number of groups of circuits which may, for example, be the outlets of one selection stage in an automatic telephone exchange.

Referring to Fig. 1, two groups of cold cathode tubes Va1 to Va3 and Vb1 to Vb3, have been provided, each comprising an anode, represented by a small circle, a cathode connected through a contact cx1 or cx2 and a resistance R1 or R2 to the batteries B1 or B2, each of these batteries being assumed to have a voltage of 150 v., and a control electrode connected to the signalling or marking wire MW.

It has been assumed that the selection is to be made in a set of three groups of circuits each comprising three circuits C11 to C13, C21 to C23 and C31 to C33. The circuit elements shown consist of the test wires of the various circuits, in each of which is inserted a busy contact BC11 to BC13, BC21 to BC23, BC31 to BC33.

The test wires of each of the first circuits in each group are connected through unidirectional current carrying devices, such as rectifiers, for example, RC11, RC21, RC31 to the common wire IW1. Similarly, the test wires of the second circuits of the different groups are connected via the rectifiers RC12, RC22, RC32 to the common wire IW2, while the test wires of the third circuits of the different groups are connected via the rectifiers RC13, RC23 and RC33 to the common wire IW3.

Two different ways of connecting wires IW1, IW2, and IW3 to the control electrodes of the group of cold cathode tubes Vb1 to Vb3 are shown in Fig. 1, said wires may be either connected individually to the control electrode of each of the tubes through the wires TW1, TW2, TW3, as indicated in dotted lines, or, through a simple test wire TW as indicated below.

The operation of the system will first of all be described on the assumption that the wires IW1, IW2, IW3 are respectively connected to the wires TW1, TW2, TW3.

The selection of a group of lines and the selection in the group of lines is entirely controlled by the group of tubes Vb1 to Vb3. The purpose of the tubes Va1 to Va3 is to register the identity of a selected group of circuits by the operation of one of the tubes corresponding to the selected group. The tubes Vb1 to Vb3 are not only intended to control the selection but also to register the identity of the selected circuit in a selected group, and thus it is by the operation of the first, second or third tube which respectively corresponds to the first, second or third circuit of each of the groups.

In the anode circuit of each of the tubes a relay Ra or Rb is inserted; the relay Ra1 comprises the contact Ra11, relay Ra2 the contact Ra21, relay Ra3 the contact Ra31; relay Rb1 comprises the contacts Rb11, Rb12 and Rb13; and relay Rb2 comprises the contacts Rb21, Rb22 and Rb23, and relay Rb3 the contacts Rb31, Rb32 and Rb33. The combination of these different relay contacts makes it possible to apply earth to one of the wires 1—9 corresponding to the three circuits of the three groups, in accordance with the group and line selected.

The various circuits among which the selection is to be operated, are characterized by time positioned impulses which are applied thereto. These impulses are repetitive impulses with a repetition rate which is the same for each circuit. The time duration of each impulse is short with respect to the time between impulses, and the impulses characterising each group of circuits are spaced in time from those characterizing any other group. These impulses are represented at φ1, φ2, and φ3 in Fig. 2, and, as shown, produce potentials of —50 volts during the period of the impulse, while the potential changes to —100 volts between impulses. These impulses are produced in a known manner by the three generators indicated in Fig. 1 as φ1 generator, φ2 generator, φ3 generator. Potential impulses in accordance with a periodic cycle φ1, φ2, and φ3, the number of impulses per cycle being equal to the number of groups of circuits, are applied to the test wires of the circuits from the impulse generators, each of the generators being assigned to a different group and the impulses thereof sent to each of the test wires in the group. Marking wire MW is connected at its end to a mobile or wiper contact *sc* in order selectively to connect said MW to one of the contacts Pt1, Pt2 or Pt3 on which are also received the same potential impulses φ1, φ2, and φ3 used to mark the groups of circuits. These same impulses φ1, φ2, and φ3 are also applied respectively to the control electrodes of the tubes Va1, Va2, and Va3.

Another set of potential impulse generators labelled P1 generator, P2 generator and P3 generator, in Fig. 1, producing repetitive impulses P1, P2, and P3 at a submultiple rate with respect to the rate of the impulses φ1, φ2, and φ3 is also employed. Each of the impulses of these generators has a time duration equal to that of a complete cycle of impulses φ1, φ2, and φ3. In the simple selective system shown, these impulses repeat at one third the rate of the impulses φ1, φ2, and φ3; in other words there is one cycle for every three cycles of φ1, φ2, and φ3. The impulses P1, P2, and P3 are spaced in time with respect to each other, as will be seen from Fig. 2, and have a potential of —50 volts, while between impulses the potential is —100 volts. The individual impulses P1, P2, and P3 are respectively applied to the control electrodes of the tubes Vb1, Vb2, Vb3.

It has been assumed that when a potential impulse is not sent, the potential of the source is —100 v.; under these conditions the potential applied to the control space of a tube is insufficient to cause it to be ionized, since the difference of potential between the cathode and the control electrode is only 50 v. At regular intervals, however, when the impulses are applied, the voltage of the control electrode may be raised to —50 volts making a difference of potential of 100 volts between the control electrode and the cathode. This potential can cause ionization of the tube if the contact *cx* of its cathode is closed.

For the operation of the tubes Va and Vb the potentials of —100 v. are ineffective control potentials, while potentials of —50 v. are effective control potentials.

The connections to the control electrodes are not made directly, but through resistances and rectifiers. For each of the individual control electrodes a connection is made through a resistance, while any other connections are made through a rectifier or rectifiers. Tube Va1, for example, has its control electrode connected to the NW wire through rectifier Rcga1, while the φ1 impulse is applied to this electrode through resistance Rha1. Tube Va2 has its control electrode connected through rectifier Rcga2 to the MW wire and to the source of φ2 impulses through resistance Rha2. Tube Va3 has its control electrode connected through rectifier Rcga3 to the MW wire and to the source of φ3 impulses through resistance Rha3. Tube Vb1 has its control electrode connected to the source of P1 impulses through rectifier Rcub1, to the MW wire through rectifier Rcgb1, and to the TW1 (or TW) wire through a resistance Rhb1. Tube Vb2 has its control electrode connected to the source of P2 impulses through rectifier Rcub2, to the MW wire through rectifier Rcgb2, and to the TW2 (or TW) wire through resistance Rhb2. Tube Vb3 has its control electrode connected to the source of P3 impulses through rectifier Rcub3, to the MW wire through rectifier Rcgb3, and to the TW3 (or TW) wire through resistance Rhb3.

The general rule for connections to control electrodes in that any number of impulse sources may be connected to each control electrode without mutual interference of the different sources and/or tubes, provided only that each of the control electrodes is connected to one source through a resistance and to all the others through a rectifier peculiar to each of them. The source connected through the resistance acts as a source from which the current is supplied to effect an ionization of the discharge gap, the other sources which are connected to the same gap through rectifiers never supply current, but only absorb the current supplied by the source connected through the resistance during the time in which the potential of the latter is effective, and at least one of the absorbent sources ineffective. For this reason the rectifiers must be poled so as to permit current to flow through the resistance from the source connected thereto.

Assume that the potential applied to the resistance connected to the control electrode of a tube is —50 volts because at that instant the impulse from one of the sources is applied thereto. Then at that instant if the potential applied to the other terminal of one of the rectifiers connected to the same control electrode is —100 volts, which is the voltage from any of the sources at the time between impulses, then current will flow through the resistance causing the control electrode to assume a potential of —100 volts and preventing the firing of the tube. If, however, the potential applied to the outside terminals of all of the rectifiers connected to the control electrode were —50 volts at this time, the rectifiers would be blocked and no current could flow through the resistance. The control electrode would therefore have a voltage of —50 volts applied to it, and since there would then be a difference of 100 volts between the control electrode and the cathode the tube would fire. In order for a tube to fire, therefore, it must have —50 volts applied to the resistance and all rectifiers connected to the control electrode. This can only happen when the impulses applied to the resistance and to all the rectifiers coincide.

Figure 2:
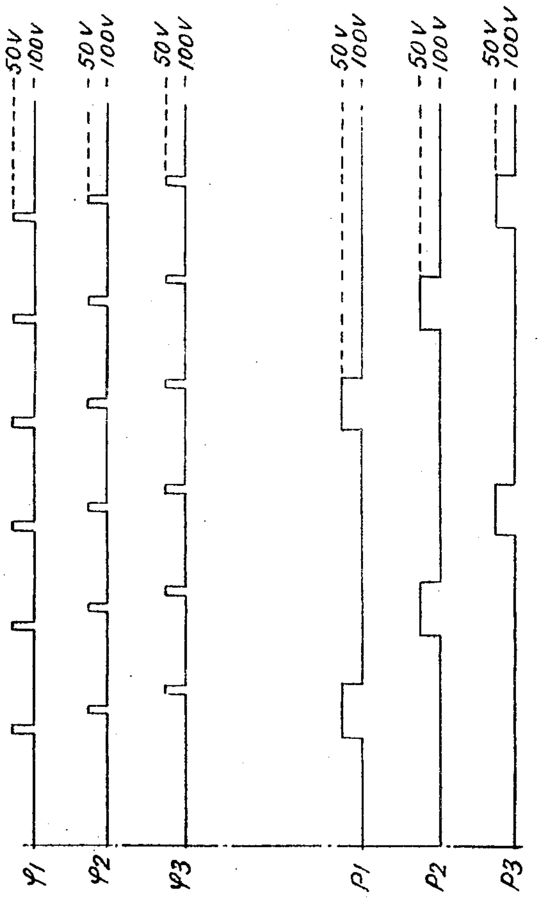
Fig. 2 shows the potential impulse curves of two different orders employed in the circuit arrangement of Fig. 1.

Instead of three groups each of three circuits, there might be any number of groups with any number of circuits as desired, for example, ten groups each of ten circuits, the number of the tubes being provided accordingly, that is to say, ten tubes V*a* and ten tubes V*b*, the number of impulse trains of Fig. 2 being increased accordingly.

The operation of the system for selecting a free circuit in a desired group will now be explained. When the device is seized for use, the contacts *cx*1 and *cx*2 are closed. The mobile contact *sc* is moved in any desired manner not shown, on to one of the contacts P*t*1 to P*t*3, to determine the group of circuits in which selection is to be made; it will be assumed that *sc* has been moved on to contact P*t*2 and that consequently the impulses φ2 are sent on the wire MW.

It will be assumed that the device has been put into use just before the impulses φ1 and P1 are generated. When the first φ1 impulse is generated, the potential of —100 v. on the test wires of the No. 1 circuits of all the groups is replaced by a potential of —50 v.

The only one of the V*a* tubes which has the φ1 impulses connected to its control grid is V*a*1, but at the instant of the φ1 impulse the MW wire has —100 volts on it, since the φ2 impulse has not yet been generated. Current will therefore flow through resistance R*ha*1 and the potential on the control electrode will be —100 volts, the same potential that is on the MW wire. The control electrodes of tubes V*a*2 and V*a*3 have —100 volts on them.

Let us consider tube V*b*1, since the impulse P1 coincides in time with φ1, a potential of —50 v. is sent from impulse P1 generator to the rectifier R*cub*1 and, if the first line of group No. 1 is free, that is to say, BC11 closed, —50 v. will be sent from φ1 impulse generator, via the wire C11, contact BC11 closed, Rc11, wire IW1, wire TW1, to the resistance R*hb*1. At the same moment wire MW is at —100 v. potential, and under these conditions rectifier R*cgb*1 is conductive and current will flow from wire TW1, via R*hb*1, R*cgb*1 to the source φ2; the drop of potential in resistance R*hb*1 maintains the control electrode of V*b*1 at —100 v. and said tube cannot be ionized.

The —100 v. potential is sent to the control electrode of tube V*b*2, via resistance R*hb*2, via TW2, IW2, and the No. 2 circuit of any group not busy, since all of these free circuits have 100 v. on them at this time. The rectifiers R*cgb*2 and R*cub*2 have —100 v. on them, but even if they had —50 v., the tube cannot be ionized because of the polarity of the rectifiers. Similarly the potential of the control electrode of V*b*3 is maintained at —100 v.

Impulse φ1 being followed by impulse φ2 from the φ2 generator, —50 volts is now applied to the MW wire from the φ2 generator over P*t*2 and Sc. The only V*a* tube with impulse φ2 applied to its control electrode circuit is V*a*2. Since —50 volts is applied to the rectifier R*cga*2 from the MW wire and to the resistance R*ha*2, no current will flow through R*ha*2 and the control electrode will be raised to —50 volts potential. This fires tube V*a*2. Current then flows from ground, through relay R*a*2, anode and cathode discharge gap of V*a*2, contact *cx*1 closed, resistance R1, battery B1, to ground. The tube V*a*2 is maintained fired and the drop in potential across resistance R1 lowers the potential on the cathodes of tubes V*a*1 and V*a*3 so that these tubes can no longer be ionized. The —50 v. potential is also sent, assuming the first line of group No. 2 to be free, to resistance R*hb*1, through C21, contact BC21 closed, rectifier RC21, wire IW1, wire TW1. The —50 v. potential is simultaneously received from wire MW on rectifier R*cgb*1, and directly on rectifier R*cub*1 from the P1 generator. Under these conditions, since both rectifiers are blocked, tube V*b*1 will operate, and cause the holding of relay R*b*1. The flow of current in the circuit: earth, relay R*b*1, anode and cathode of V*b*1, and contact *cx*2, resistance R2, battery B2 maintains on the one hand the tube V*b*1 fired at the end of the reception of the impulse φ2 and on the other hand causes a drop of potential in the resistance R2 which applies the cathodes of V*b*2 and V*b*3 to such a potential that said tubes can no longer be ionized.

It will be noted that although a potential of —100 v. is sent in each time unit to two of the three test wires in parallel C11, C21, C31—C12, C22, C32 and C13, C23, C33, the potential of —50 v. received on the third test wire is effectively received on the corresponding wire IW1, IW2 or IW3 owing to the action of rectifiers Rc11 to Rc13, Rc21, to Rc23, Rc31 to Rc33 inserted in the circuit for connection of each of the test wires of the circuit to the wires IW. If all the circuits are free, the —50 v. potential is effectively transmitted to all the wires IW1, IW2, IW3 for the different impulses φ1, φ2, φ3; if certain circuits are busy, the contact BC associated with said circuits is opened, and the corresponding impulse cannot be received on wire IW.

If circuit C21 were busy, the tube V*b*1 could not operate during the reception of the impulse φ2 because there would be no —50 volts on the resistor R*hb*1. Similarly it cannot during reception of the impulse φ3, which follows it, since the potential of —100 v. would then be received on the wire MW. During the reception of the cycles of impulses corresponding to the impulses P2 and P3 it cannot operate, since —100 v. is then applied to the rectifier R*cub*1. If the circuit C22 is free, at the time of the simultaneous reception of impulses φ2 and P2, tube V*b*2 will operate. If the circuit C22 is busy the circuits connected to the wire IW3 will be tested during the reception of impulse P3 and if circuit C23 is free tube V*b*3 will operate.

It will be assumed that tubes V*a*2 and V*b*1 have operated causing relays R*a*2 and R*b*1 to be held. Earth is then connected via make contacts R*a*21 and R*b*12 on the outlet 4 in the second group of outlets. This circuit can be used to effect the desired control or signalling.

It will be seen that if it is desired to select a free circuit in the first group, the switch Sc will be set on Pt1 and Va1 will operate; if it is desired to select a free circuit in the second group, Sc will be set on Pt2 and Va2 will operate; if it is desired to select a free circuit in the third group, Sc will be set on Pt3 and Va3 will operate. It will also be seen that the selection of a particular free circuit in the selected group will determine which of the tubes Vb1 to 3 will operate. Thus the operated Vb tube will be an indication of which circuit in a group has been selected.

Arrangements may be provided to connect in addition to a source $\varphi$, one of the impulse sources P1, P2, P3 to the marking wire MW, by inserting a resistance in the circuit for connection to the wire MW of the source $\varphi$ and a rectifier in the circuit for connection of source P to the wire MW or vice versa. In this case, the device makes it possible to test a circuit in a particular group since the only tube directly connected to the source P connected to the wire MW is able to operate.

If the test device is placed at a certain distance from the circuits to be tested, it is desirable to reduce the number of interconnecting wires of the two parts of the system. This can be done by replacing the wires shown in dotted lines TW1, TW2, TW3 for individual connection of the tubes Vb1, Vb2, Vb3, to the wires IW1, IW2, IW3, by the common wire TW, shown in continuous lines. In this case, the connections of the wires IW to the wire TW are respectively effected via resistances and rectifiers Rhp1, Rcp1—Rhp2, Rcp2—Rhp3, Rcp3. Furthermore, the impulse sources P1, P2, and P3 are respectively connected to the wires IW1, IW2, IW3 via rectifiers Rdp1, Rdp2, Rdp3 and resistances Rhp1, Rhp2, Rhp3. In these conditions the impulses received on the wire IW1 will only be received on the wire TW for the duration of one impulse P1 and can, owing to this, only cause the operation of the tube Vb1. Similarly, the impulses received on the wires IW2 and IW3 can only respectively cause the operation of tubes Vb2 and Vb3.

Of course it would be possible without departing from the scope of the invention to replace the cold cathode tubes by any device capable of causing a switching action when a particular potential is applied to its control circuit, in the same way that it is possible to choose for the different potentials such values that the switching device would operate in certain conditions.

What is claimed is:

1. An arrangement for selecting a circuit in one of a plurality of circuit groups, comprising a plurality of sources of pulse trains, arranged in two groups with the pulses of the first group of sources having a repetition rate which is a multiple for the repetition rate of the pulses of the second group of sources, the pulse trains of each group having different time positions within the group, the time duration of all pulses in a group being the same but the time duration of each pulse of the second group being sufficient to encompass a complete cycle of the pulse trains of said first group, means for connecting a different one of said first group of sources of pulse trains to each group of circuits, a plurality of coincidence trigger devices, each having a plurality of inputs and adapted to operate only when voltages at least as great as said pulses are applied simultaneously to all said inputs, said devices being arranged in two groups, the first group having a number of devices equal to the number of circuit groups and corresponding respectively to said circuit groups, the second group having a number of devices equal to the number of circuits in a group and corresponding respectively to the circuits of a group, means for selectively applying pulse trains from said first group of sources to one input of each of said devices, means for applying pulse trains from said first group of sources respectively to second inputs of the devices of said first group, means for applying pulse trains from said second group of sources respectively to second inputs of the devices of said second group, means for connecting third inputs of the devices of said second group respectively to corresponding circuits of each group of circuits, a plurality of control circuits corresponding to the circuits of said groups, and means controlled by the combination of devices operated for energizing a selected one of said control circuits.

2. An arrangement, according to claim 1, in which the trigger devices comprise electronic discharge paths, each path having an anode, a cathode, and a control electrode, the inputs being connected to the control electrodes, there being one input for each pulse train applied, one of said inputs including a resistance and the others including rectifiers poled so that current flowing through said resistance between said inputs will produce a drop in potential on said control electrode.

3. An arrangement, according to claim 2, in which individual leads are provided for connecting the third inputs of the devices of the second group to corresponding circuits of each group of circuits.

4. An arrangement, according to claim 1, in which a single lead is provided for connecting all the third inputs of the devices of the second group to corresponding circuits of each group of circuits, the connection of each group of corresponding circuits to said single lead comprising a resistance and a first rectifier in series therewith, the rectifier being connected to the single lead and poled in a direction so that current can flow towards said devices, an auxiliary lead including a second rectifier connected to the junction of said resistance and first rectifier, with said second rectifier so poled that current can flow out of said auxiliary lead, and means for applying pulse trains from said second group of sources respectively to said auxiliary leads.

5. An arrangement, according to claim 4, in which individual means is provided for each circuit for breaking the connection between it and a third input of the second group of trigger devices when the circuit is in a predetermined condition.

6. An arrangement, according to claim 5, in which the means for energizing a selected one of the control circuits comprises a plurality of relays, one connected to each device in the first and second groups of devices and arranged to operate when said device operates, the control circuits including contacts of said relays.

7. An arrangement, according to claim 1, in which individual means is provided for each circuit for breaking the connection between it and a third input of the second group of trigger devices when the circuit is in a predetermined condition.

8. An arrangement, according to claim 1, in which the trigger devices comprise electronic discharge paths, each path having an anode, a cathode, and a control electrode, the inputs being connected to the control electrodes, there being one input for each pulse train applied, one of said inputs including a resistance and the others including rectifiers poled so that current flowing through said resistance between said inputs will produce a change in potential on said control electrode, and in which the means for energizing a selected one of the control circuits comprises a plurality of relays, one connected to each device in the first and second groups of devices and arranged to operate when said device operates, the control circuits including contacts of said relays.

MARTINUS DEN HERTOG.

REFERENCES CITED

The following references are of record in the file of this patent:

UNITED STATES PATENTS

| Number | Name | Date |
|---|---|---|
| 2,338,242 | Haigh | Jan. 4, 1944 |
| 2,452,578 | Kruithof et al. | Nov. 2, 1948 |
| 2,454,809 | Kruithof et al. | Nov. 30, 1948 |
| 2,484,612 | Dehn et al. | Oct. 11, 1949 |